(12) United States Patent
Hannigan et al.

(10) Patent No.: US 12,710,572 B2
(45) Date of Patent: Aug. 18, 2026

(54) MULTI-LAYER HIGH-EFFICIENCY DIELECTRIC GRATING WITH IMPROVED MANUFACTURABILITY

(71) Applicant: II-VI Delaware, Inc., Wilmington, DE (US)

(72) Inventors: Justin Hannigan, Eugene, OR (US); Dmitri Iazikov, Eugene, OR (US); Christoph Greiner, Eugene, OR (US); John Hostetler, Eugene, OR (US)

(73) Assignee: II-VI DELEWARE, INC., Wilmington, DE (US)

( * ) Notice: Subject to any disclaimer, the term of this patent is extended or adjusted under 35 U.S.C. 154(b) by 200 days.

(21) Appl. No.: 18/382,366

(22) Filed: Oct. 20, 2023

(65) Prior Publication Data

US 2024/0201426 A1 Jun. 20, 2024

Related U.S. Application Data

(60) Provisional application No. 63/432,504, filed on Dec. 14, 2022.

(51) Int. Cl.
*G02B 5/18* (2006.01)

(52) U.S. Cl.
CPC ......... *G02B 5/1857* (2013.01); *G02B 5/1861* (2013.01); *G02B 5/1866* (2013.01)

(58) Field of Classification Search
None
See application file for complete search history.

(56) References Cited

U.S. PATENT DOCUMENTS

2006/0018020 A1* 1/2006 Hikichi ................ G02B 5/1866 359/569
2006/0152809 A1* 7/2006 Smith .................. G02B 5/1861 359/569
2007/0070276 A1* 3/2007 Tan ...................... H04N 9/3167 348/E9.027
2009/0059375 A1* 3/2009 Hoose .................. G02B 5/1861 359/572
2025/0130355 A1* 4/2025 Hannigan ............. G02B 1/115

* cited by examiner

*Primary Examiner* — Derek S. Chapel
(74) *Attorney, Agent, or Firm* — McAndrews, Held & Malloy, Ltd.

(57) ABSTRACT

Systems and methods are provided for multi-layer high-efficiency dielectric grating with improved manufacturability. An example diffraction grating based morphology includes a plurality of grating lines; a plurality of intermediate layers; and a substrate bearing both of the plurality of grating lines and the plurality of intermediate layers; where one or more of the plurality of grating lines include a plurality of grating layers; and where at least two of the plurality of grating layers include different refractive index (RI) material. The plurality of grating layers includes one or more layers having low refractive index (RI) material and one or more layers having high refractive index (RI) material. The plurality of intermediate layers includes a plurality of matching layers and a plurality of dielectric layers.

23 Claims, 6 Drawing Sheets

100

MULTI-LAYER HIGH-EFFICIENCY DIELECTRIC GRATING WITH IMPROVED MANUFACTURABILITY

CLAIM OF PRIORITY

This patent application claims priority to and claims benefit from U.S. Provisional Patent Application Ser. No. 63/432,504, which was filed on Dec. 14, 2022.

TECHNICAL FIELD

Aspects of the present disclosure relate to optical communication based solutions. More specifically, certain implementations of the present disclosure relate to methods and systems for implementing and utilizing multi-layer high-efficiency dielectric grating with improved manufacturability.

BACKGROUND

Limitations and disadvantages of conventional diffraction gratings will become apparent to one of skill in the art, through comparison of such systems with some aspects of the present disclosure as set forth in the remainder of the present application with reference to the drawings.

BRIEF SUMMARY

System and methods are provided for multi-layer high-efficiency dielectric gratings with improved manufacturability, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

The present disclosure is directed to diffraction gratings, and particularly to morphologies used therein. In particular, implementations based on the present disclosure relate to diffraction gratings for high energy laser systems based on spectral (grating based) beam combining. In this regard, a diffraction grating is an optical component having a periodic structure configured to resolve (e.g., angularly disperse) an incident light into several beams travelling in different directions. Diffraction gratings may have different uses. For example, diffraction gratings may be used in fiber optics, such as in optical fibers incorporating diffraction gratings within the fibers for optimizing optical performance thereof. In this regard, diffraction gratings may be used to combine multiple high power monochromatic laser beams of slightly different wavelengths into a single high energy output beam. Solutions in accordance with the present disclosure provide enhanced diffraction gratings and grating based morphologies as described in more detail below.

Figure 1:
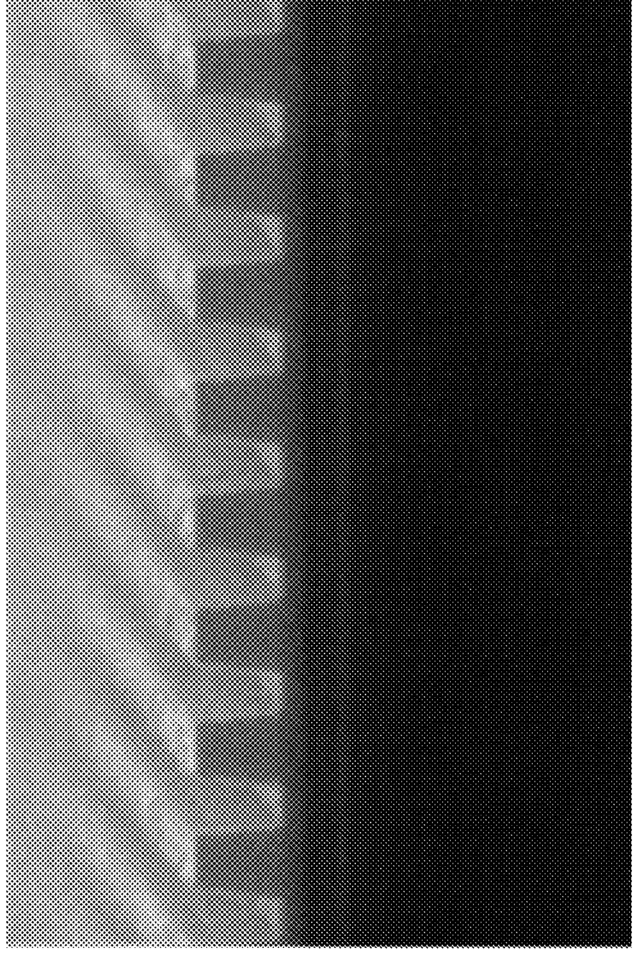
FIG. 1 illustrates a cross-section of an example diffraction grating.

FIG. 1 illustrates a cross-section of an example diffraction grating. Shown in FIG. 1 is diffraction grating 100. The diffraction grating 100 comprises a surface with multiple lines and spaces, configured for facilitating grating functions. The diffraction grating 100, and the grating functions thereby, may be designed for a specific application for example. The diffraction grating 100 has periodic lines and spaces—that is, close, equidistant, and parallel lines, separated by corresponding close, equidistant, and parallel spaces. Thus, the diffraction grating 100 has lines of equal size, spaced by equal size spaces. Such structure, particularly when the material used therein is selected suitably, may resolve incident light signals of differing wavelengths in a particular manner and with high efficiency. An example reflection grating operation is illustrated in, and described in more detail with respect to FIG. 2.

Figure 2:
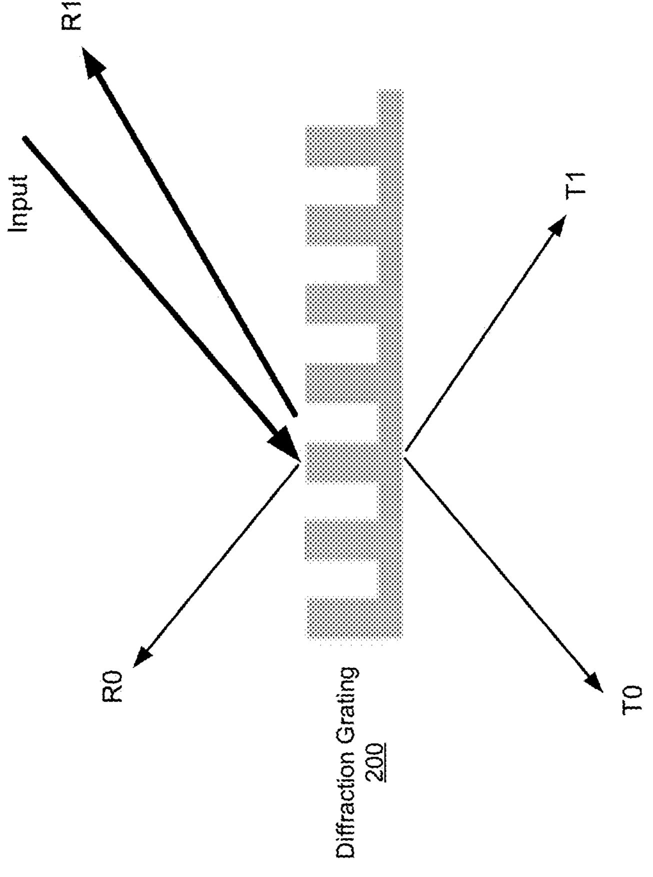
FIG. 2 illustrates an example reflection grating with a single propagating order.

FIG. 2 illustrates an example reflection grating with a single propagating order. Shown in FIG. 2 is diffraction grating 200 and grating operation performed therewith. In this regard, the diffraction grating 200 comprises a surface with close, equidistant, and parallel lines, configured for resolving incident light (or optical signals). Illustrated in FIG. 2 is an example reflection grating operation, using the diffraction grating 200, with a single propagating order. In this regard, application of an input beam onto the diffraction grating 200, with the input beam striking the diffraction grating 200 from the top side, results in a number of corresponding outputs.

In particular, shown in FIG. 2 is an example reflection grating with the input beam and the corresponding permitted output orders. The outputs are zero-order reflection (R0), zero-order transmission (T0), first-order transmission (T1) and first-order reflection (R1). For efficient operation, it is desirable that R1 contain most of the power and to minimize the power in all other output channels (R0, T0, and T1). One parameter that may be used in characterizing grating operations is diffraction efficiency, which is defined as the power in a particular order divided by the input power. Where the input beam is normalized to unity, the value of R1 is the diffraction efficiency into that order.

Embodiments in accordance with the present disclosure are directed to diffraction gratings, and particularly to morphologies for high-performance diffraction gratings with improved manufacturability. In this regard, diffraction gratings for applications requiring high efficiency and large laser-induced damage threshold (LIDT) may suffer from manufacturability limitations. Some designs may utilize fused silica grating lines integrated with multiple dielectric layers. Performance requirements lead to morphological requirements of a large duty cycle, defined as ratio of line width over grating period (e.g., a duty cycle greater than 65%), and/or a large grating line height. Such requirements may be challenging for photolithographic grating patterning and commonly used positive photoresists. In addition, low refractive index (RI) grating lines, which are commonly used, may limit achievable diffraction efficiency. Other designs may introduce a high-RI material into the grating line to provide improved performance and reduce the required line width. However, in such designs, the etched trench terminates within the high-RI material. This may pose significant challenges for manufacturability due to the inability to utilize endpoint detection for termination of the etching process or an etch-stop layer. Each grating must be carefully etched to the correct depth relying on tight process control and metrology to verify achieved etch depths.

Solutions based on the present disclosure overcome at least some of the challenges with such designs by use of morphologies that optimize performance while allowing for improved manufacturability. In this regard, various example embodiments in accordance with the present disclosure incorporate use of improved grating base morphologies that comprise multi-layer grating lines and associated underlying layers. In particular, an example multi-layer based grating morphology may comprise multi-layer grating lines comprising of a plurality of layers, a set of matching layers below the grating lines, a set of dielectric layers below the matching layers, and a substrate bearing the grating lines and all these layers. Further, while some existing gratings may incorporate different material, and/or may even incorporate alternating layers of different material, such layers are typically very thin compared to wavelength and serve non-optical function (e.g., avoiding crystallization of hafnia), the multi-layer structure used in solutions based on the present disclosure is configured to serve an optical function, and as such may have different and unique characteristics compared to any existing solutions—e.g., the thickness of the layer (the multi-layer grating lines) may be comparable to ¼ of wavelength or thicker.

Each of the multi-layer grating lines may comprise a number of layers comprising different refractive index (RI) material. For example, the multi-layer grating line may comprise a minimum of three layers in a L-H-L arrangement of layers, where L indicates a low refractive index material (e.g., silicon dioxide ($SiO_2$) in some of the embodiments disclosed here) and H indicates a high refractive index material (e.g., hafnium dioxide ($HfO_2$) in some of the embodiments disclosed here). However, the disclosure is not limited to such arrangement, and any suitable arrangement may be used. In this regard, the multi-layer grating lines may have an L layer at the top, and then more layers added, particularly by incrementing H-L pairs—that is, one example embodiment, L-H-L would be a minimum arrangement, but an arrangement such as L-H-L-H-L may also be used, for example.

Further, the disclosure is not limited to a specific material used in the grating lines described herein—that is silicon dioxide ($SiO_2$) and hafnium dioxide ($HfO_2$), and any suitable material may be used. Nonetheless, predetermined criteria may be used in selecting material used in the different layers. For example, material used generally may have refractive index (RI) no higher than hafnium dioxide and no lower than silicon dioxide (or, alternatively, have RI that not higher than a pre-determined upper limit, and not lower than a pre-determined lower limit—e.g., the upper limit may be 4 and the lower limit may be 1). Further, one of the determining factors considered in selecting material used in the different layers in the grating lines may be the minimum difference (delta) between the two layers with respect to the refractive index (RI) thereof. In this regard, there has to be minimum contrast of at least some pre-determined value between the two layers. For example, it may be beneficial to have a minimum contrast of at least 0.5 between the two layers. In this regard, it should be understood that such refractive index minima contrast is a non-limiting example, and should not be construed as limiting the scope of the present disclosure. As such, for each specific grating a different (e.g., higher or lower) refractive index minimum contrast may be used, such as based on such value being determined (e.g., based on testing) to have optimal benefits.

The set of matching layers may comprise one or more impedance matching dielectric layers used to optimally couple signals propagating through the grating lines to underlying dielectric layers and to optimize the overall diffraction efficiency. The set of matching layers may comprise multiple layers of different refractive index (RI) material, preferably arranged in alternating manner—that is, an H-L based arrangement.

The set of dielectric layers may comprise one or more dielectric layers providing either increased reflectivity (i.e., a Bragg mirror) or increased transmissivity (i.e., anti-reflective (AR) coating). The set of dielectric layers may comprise multiple layers of different refractive index (RI) material, preferably arranged in alternating manner—that is, an H-L based arrangement.

Embodiments incorporating diffraction grating based morphologies in accordance with the present disclosure may be configured for operating over various wavelength ranges. An example embodiment may be configured for operation over a wavelength range of 1035 nm to 1075 nm.

Improved morphologies based on the present disclosure may provide various benefits with respect to manufacturability and performance in comparison to any existing solutions. These benefits may include terminating the etched trench at an etch-stop boundary that provides more robust etch depth accuracy. Also, the improved morphologies may permit use of spectroscopic endpoint methods to determine when to halt the etch process (e.g., getting a signal when the etch process reaches the interface) and benefit from slow-down of the process. Further, the improved morphologies may offer improved etch depth uniformity compared to a timed etch that terminates within a layer of material. In addition, the incorporation of high-RI material reduces the required duty cycle of the grating lines. Finally, higher performance permits looser morphological tolerances.

Example embodiments incorporating enhanced reflection gratings and morphologies based therein, in which the set of dielectric layers near to the substrate comprise a Bragg mirror, are described in more detail below.

Figure 3:
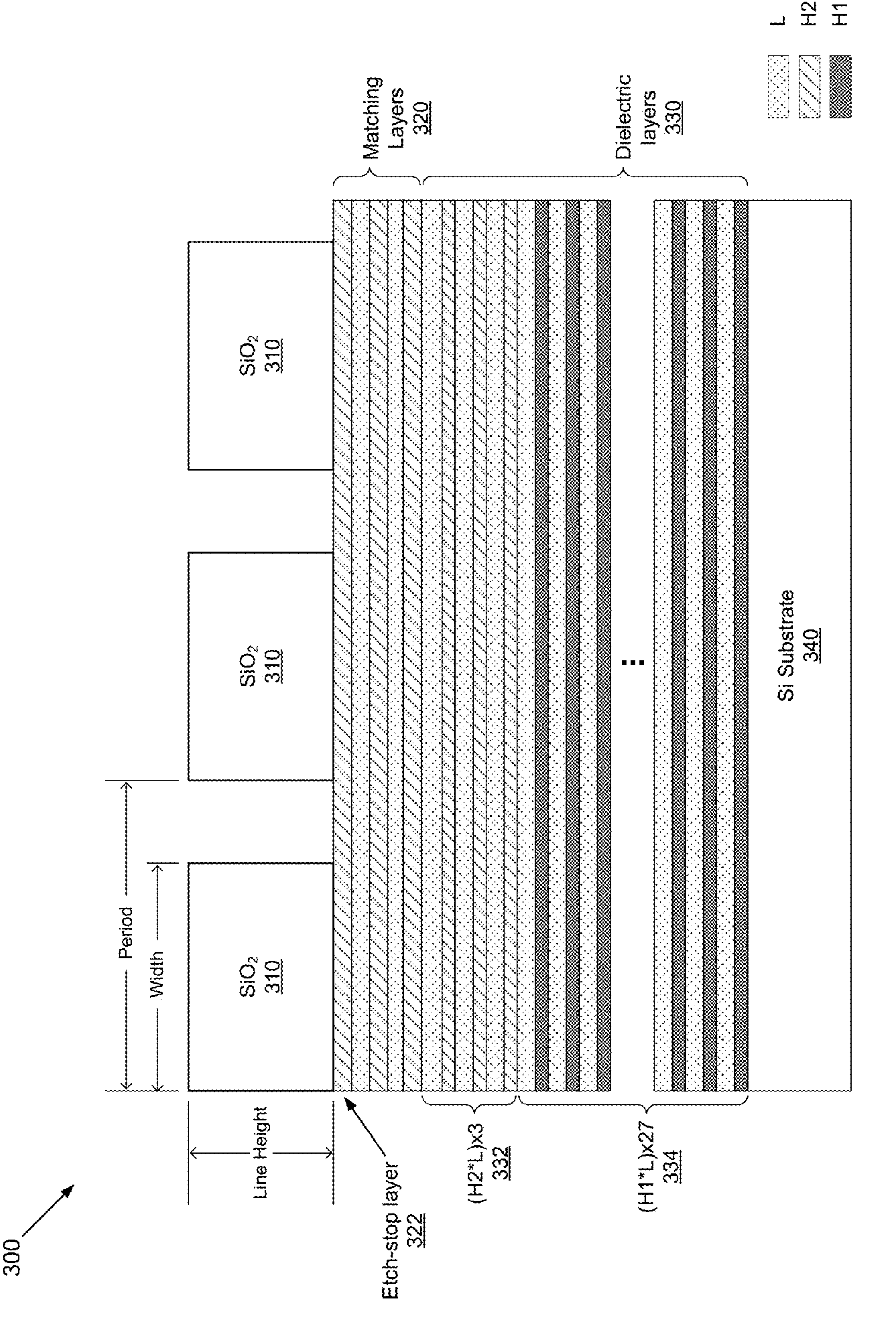
FIG. 3 illustrates an example single-layer reflection grating based morphology.

FIG. 3 illustrates an example single-layer reflection grating based morphology. Shown in FIG. 3 is single-layer reflection grating based morphology 300 (or a portion thereof). In particular, illustrated in FIG. 3 is a cross-section of the morphology 300 showing the single-layer based grating structure and the underlying layers.

As shown in FIG. 3, the morphology 300 comprises single-layer (e.g., silicon dioxide ($SiO_2$) based) grating lines 310, a plurality of matching layers 320, a plurality of dielectric layers 330, and a substrate (e.g., silicon based) 340.

Each of the single-layer grating lines 310 comprises a single layer composed of the same material. For example, in the example embodiment illustrated in FIG. 3, the single-layer grating lines 310 may comprise silicon dioxide ($SiO_2$) based single-layer grating lines. In addition to the material used therein, grating lines may be characterized by particular parameters, such as line height, line width, grating period, and duty cycles. In this regard, as noted above, the duty cycle is defined as the line width divided by the grating period—that is, duty cycle=line width/grating period. As such, the line width of the grating lines may simply be indicated in terms of the duty cycle where the grating period is indicated.

In the portion of the morphology 300 illustrated in FIG. 3, only three (3) grating periods are shown, but it is to be understood that the grating consists of a large number of lines. For example, the morphology 300 may have a line density of 1160 lines/mm, corresponding to a grating period of 862 nm. Further, in the example embodiment illustrated in FIG. 3, the single-layer grating lines 310 have a duty cycle of 64%, for example, and as such with a grating period of 862 nm, the line width of the single-layer grating lines 310 in the morphology 300 may be 551.68 nm. Further, while the grating lines are shown as having a cross-section profile with a simple rectangular shape, the disclosure is not limited to such shape, and as such other shapes may be used (if deemed suitable)—e.g., the cross-section profile of the lines may be trapezoidal or have curvilinear contours and modelled and optimized accordingly.

The plurality of matching layers 320 comprises a set of impedance matching dielectric layers, configured (e.g., based on selection of material used therein) and/or arranged for optimally coupling the grating structure (the single-layer grating lines 310) to underlying dielectric layers 330, and optimizing overall diffraction efficiency. In this regard, optimal coupling may entail and/or be characterized in terms of electric field phase matching.

The plurality of dielectric layers 330 comprises a set of dielectric layers configured (e.g., based on selection of material used therein) and/or arranged for providing either increased reflectivity (e.g., functioning as a Bragg mirror) or increased transmissivity (e.g., functioning as an anti-reflective (AR) coating).

The substrate 340 may comprise suitable material and may have preset dimensions, for optimizing performance. For example, as shown in the example embodiment illustrated in FIG. 3, the substrate 340 may comprise a silicon (Si) based substrate, having 75 mm diameter with thickness of 6 mm. In some instances, the substrate may comprise (e.g., may be also made of) material that is substantially transparent in the operating wavelength range. This may be done especially when, e.g., the dielectric layers 330 are configured to increase transmissivity.

The plurality of matching layers 320 may comprise alternating layers of high refractive index (RI) and low refractive index (RI) material. Similarly, the plurality of dielectric layers 330 may comprise alternating layers of low-RI and high-RI material. In this regard, in some instances, different high-RI and/or low-RI material (and layers comprising such material) may be used. For example, in the example embodiment illustrated in FIG. 3, two different high-RI materials may be used, identified hereinafter as H1 and H2, and only one low-RI material may be used, identified hereafter as L. In this regard, H1 may comprise tantalum pentoxide ($Ta_2O_5$), H2 may comprise hafnium dioxide ($HfO_2$), and L may comprise silicon dioxide ($SiO_2$), for example.

The first layer (322) of the plurality of matching layers 320 below the single-layer grating lines 310 acts as an etch-stop layer. As such, where the grating line comprise low-RI material (such as $SiO_2$, as it is the case in the morphology 300), the etch-stop layer 322 may comprise high-RI material. For example, in the morphology 300, the etch-stop layer 322 comprises H2 material—that is, $HfO_2$. Beyond the etch-stop layer 322, the plurality of matching layers 320 may comprises pairs of H-L based layers. In one embodiment, the same material is used throughout. As such, where the etch-stop layer 322 comprises H2 material, the plurality of matching layers 320 may comprise pairs of H2-L based layers. For example, in the example embodiment illustrated in FIG. 3, the plurality of matching layers 320 in the morphology 300 comprises a H2-L-H2-L-H2 arrangement.

The plurality of dielectric layers 330 may comprise two separate subsets: a first dielectric layers subset 332 and a second dielectric layers subset 334, with each comprising different combinations of low-RI and high-RI based layers. For example, in the example embodiment illustrated in FIG. 3, the first dielectric layers subset 332 comprises one or more pairs of H2-L based layers, whereas the second dielectric layers subset 334 comprises one or more pairs of H1-L based layers. In this regard, the exact number of layers in the plurality of dielectric layers 330 as a whole, and in each of the first dielectric layers subset 332 and the second dielectric layers subset 334, may be determined adaptively, such as for optimizing performing of the plurality of dielectric layers 330 and/or the morphology 300 as a whole. For example, in the example embodiment illustrated in FIG. 3, the first dielectric layers subset 332 comprises three (3) pairs of H2-L based layers, whereas the second dielectric layers subset 334 comprises twenty seven (27) pairs of H1-L based layers.

Various aspects or parameters of at least some of the features and/or components of the morphology 300 may be adaptively selected based on the desired performance. In this regard, in some embodiments, an optimization algorithm (e.g., least squares minimization of a merit function, related to, for example, rigorous coupled-wave analysis (RCWA) calculation of diffraction efficiency) may be used in determining at least some of these aspects or parameters. For example, such optimization algorithm may be used in determining number of layers and/or thickness of each the plurality of matching layers 320 and the plurality of dielectric layers 330 as a whole, and/or thickness of each of the layers therein.

For example, in the example embodiment illustrated in FIG. 3, based on use of such optimization algorithm, in the H2-L-H2-L-H2 arrangement used in the plurality of matching layers 320, the 5 individual layers (starting with the etch-stop layer 322) may have thickness of, respectively: 237 nm, 77 nm, 194 nm, 182 nm, and 156 nm. The thickness of each of L, H1, and H2 layers used in the plurality of dielectric layers 330 may be, respectively: 205.4 nm, 146.15 nm, and 157.8 nm. Further, while the arrangement is shown as having a cross-section profile of a simple rectangular shape, the disclosure is not limited to such shape, and as such other shapes may be used—e.g., the cross-section profile of the lines may be trapezoidal or have curvilinear contours and modelled and optimized accordingly.

Figure 4:
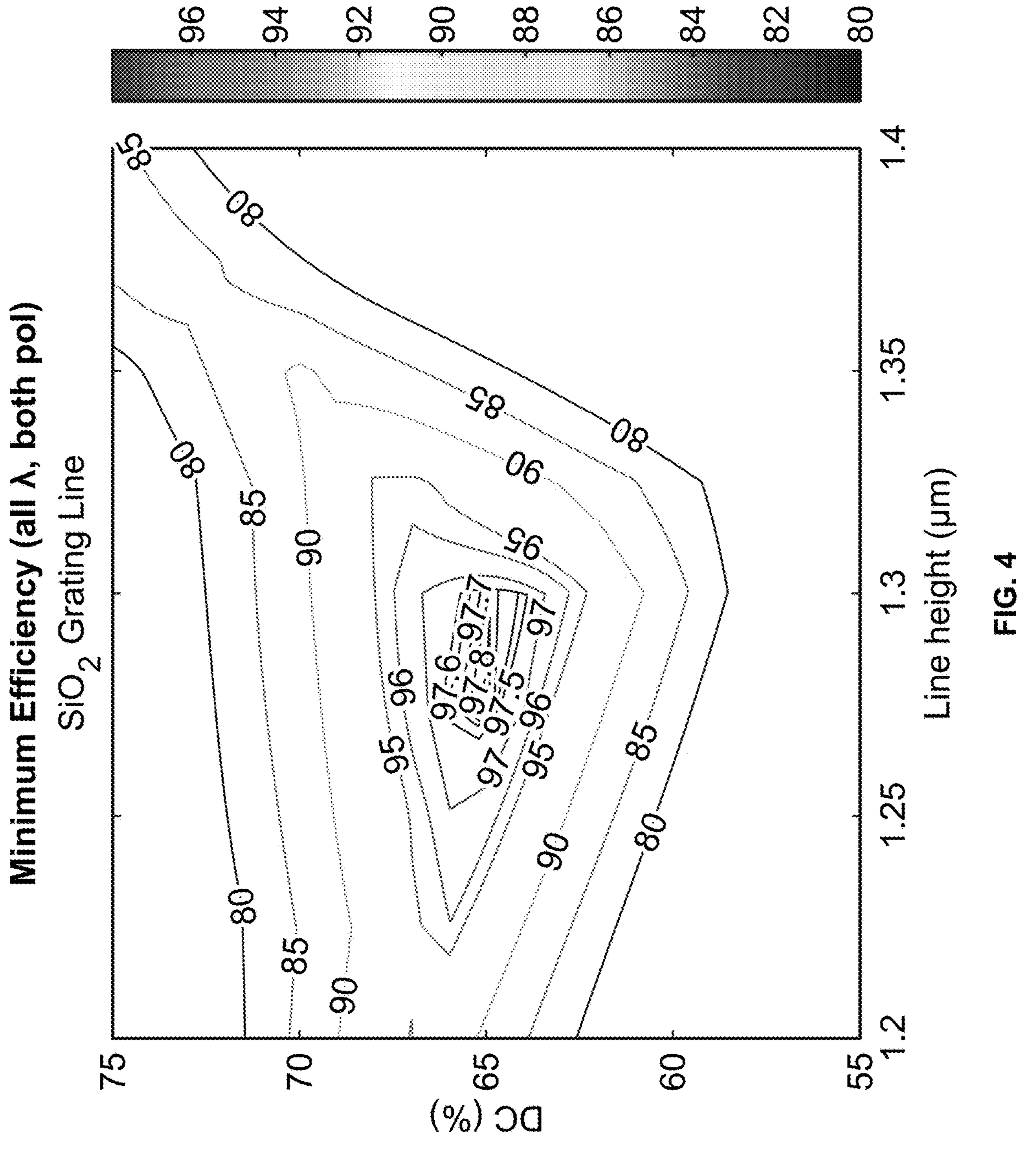
FIG. 4 is a contour plot illustrating performance contours for an example single-layer reflection grating based morphology.

FIG. 4 is a contour plot illustrating performance contours for an example single-layer reflection grating based morphology. Shown in FIG. 4 is a plot 400. In this regard, plot 400 comprises data representing performance (minimum diffraction efficiency in %, for all wavelengths, λ, and for two polarization components) of a single-layer reflection grating based morphology (e.g., the morphology 300 of FIG. 3), as a function of duty cycle (y-axis) and line height in μm (x-axis) of the grating lines in the morphology.

As shown in FIG. 4, plot 400 comprises contours of minimum diffraction efficiency—that is, contour lines connecting data points corresponding to particular minimum diffraction efficiency value. As used herein, minimum diffraction efficiency corresponds to the minimum value for R1 over swept wavelengths, λ, and for the two polarization components. The plot 400 shows the performance contours for the single-layer based morphology 300 comprising $SiO_2$ grating line(s).

The plot 400 (or, particularly, counters therein) may be interpreted similarly to a topographical map. As such, plot 400 shows a peak at approximately 64% duty cycle and 1.29 μm line height. The plot 400 indicates the range of variation in the two parameters that can be tolerated in order to realize a particular performance level. For example, in order to realize a 95% minimum diffraction efficiency, these two parameters must be constrained to the interior of the "95" contour. As illustrated in plot 400, there is small window/area where 97% minimum diffraction efficiency may be achieved, and 99% minimum diffraction efficiency is not reached.

Figure 5:
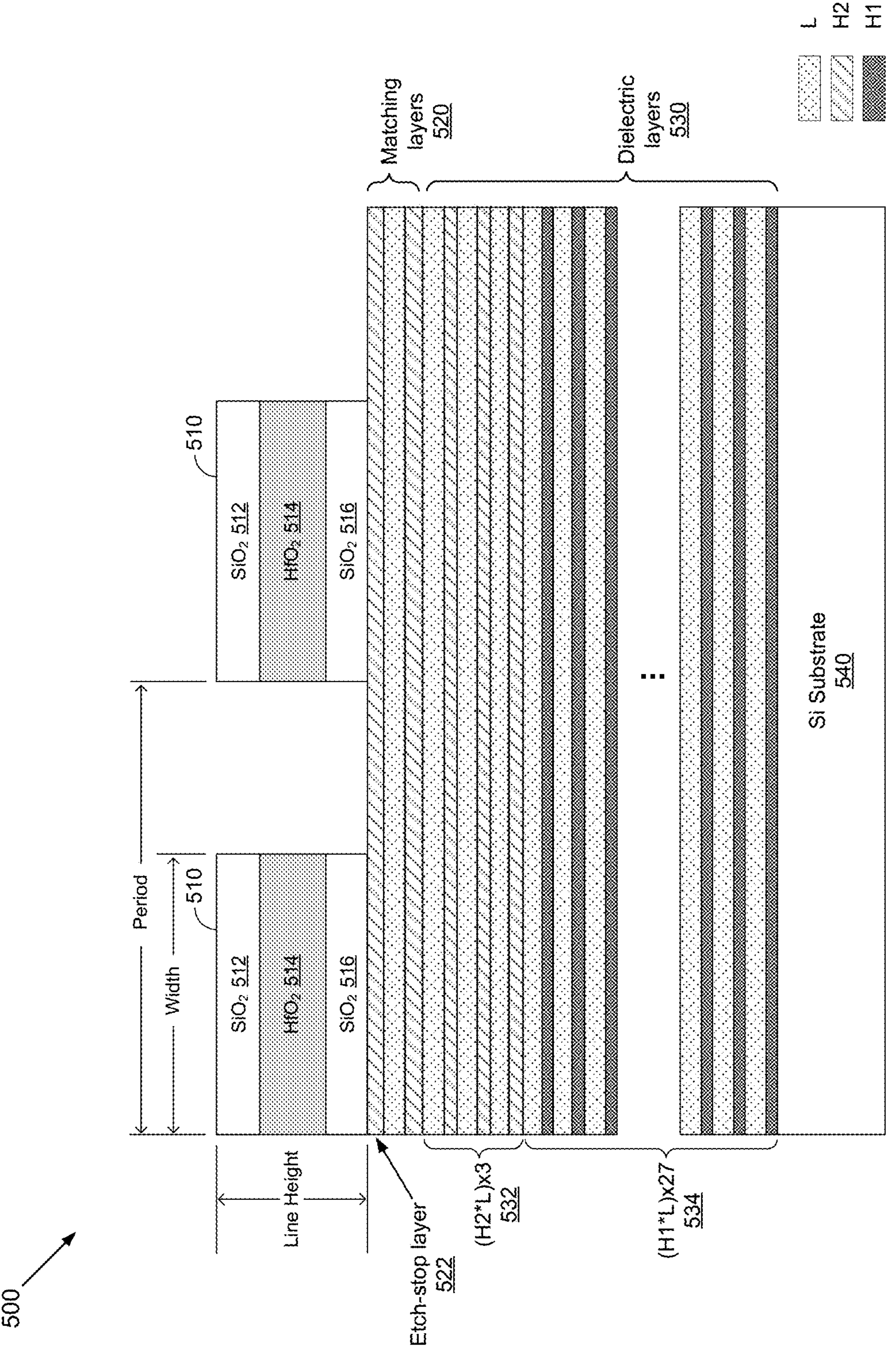
FIG. 5 illustrates an example multi-layer reflection grating based morphology.

FIG. 5 illustrates an example multi-layer reflection grating based morphology. Shown in FIG. 5 is multi-layer reflection grating based morphology 500 (or a portion thereof). In particular, illustrated in FIG. 5 is a cross-section of the morphology 500 showing the multi-layer based grating structure and the underlying layers.

As shown in FIG. 5, the morphology 500 comprises multi-layer (e.g., silicon dioxide ($SiO_2$) and $HfO_2$ based) grating lines 510, a plurality of matching layers 520, a plurality of dielectric layers 530, and a substrate (e.g., silicon) 540. In this regard, unless described otherwise, the components of the morphology 500 may be similar to the similarly-named components in the morphology 300 of FIG. 3. However, the key difference is that the morphology 500 incorporates multi-layer based grating structure—e.g., the multi-layer grating lines 510 as shown in FIG. 5.

In this regard, each of the multi-layer grating lines 510 comprises multiple layers, each comprising a different material. In particular, the layers used in the multi-layer grating lines 510 may comprise material having different refractive index (RI). The multi-layer grating lines 510 may comprise, for example, alternating layers of high refractive index (RI) and low refractive index (RI) material. For example, in the example embodiment illustrated in FIG. 5, the multi-layer grating lines 510 may comprise a hafnium dioxide ($HfO_2$) layer 514 surrounded by two silicon dioxide ($SiO_2$) layers 512 and 516. In this regard, as noted above, while there may be some existing gratings (e.g., nanolaminated gratings) that utilize alternating layers of hafnia and silica, such layers in these gratings are very thin compared to wavelength and serve non-optical function (e.g., avoiding crystallization of hafnia), whereas in multi-layer gratings based on the present disclosure (e.g., multi-layer grating lines 510), the layer thickness is comparable to ¼ of wavelength or thicker and serve an optical function. Nonetheless, the disclosure is not limited to such multi-layer arrangement, and any other suitable arrangements may be used. In this regard, preferably the top layer in the multi-layer based grating structure may comprise low refractive index (RI) material (e.g., $SiO_2$), followed by pairs of H-L based layers. Further, similar to the single-layer grating lines, multi-layer grating lines may also be characterized by, in addition to the material used therein, parameters such as line height, line width, grating period, and duty cycles. In instances where the cross-section of a line is not rectangular (e.g., trapezoidal or with curvilinear sidewalls), line width and duty cycle may be defined using parameters defined at a certain height or as average value at different heights.

In the portion of the morphology 500 illustrated in FIG. 5, only two (2) grating periods are shown, but it is to be understood that the grating consists of a large number of lines. For example, the morphology 500 may have, similar to the morphology 300, a line density of 1160 lines/mm, corresponding to a grating period of 862 nm. The use of multi-layer-based structure may allow for use of smaller duty cycle, however. For example, in the example embodiment illustrated in FIG. 5, the multi-layer grating lines 510 have a duty cycle of 57%, and as such, with a grating period of 862 nm, the line width of the multi-layer grating lines 510 in the morphology 500 may be 491.34 nm. Further, while the grating lines are shown as having a cross-section profile with a simple rectangular shape, the disclosure is not limited to such shape, and as such other shapes may be used (if deemed suitable)—e.g., the cross-section profile of the lines may be trapezoidal or have curvilinear contours and modelled and optimized accordingly.

The plurality of matching layers 520 may be substantially similar to the plurality of matching layers 320 as described above, and as such similarly comprises a set of impedance matching dielectric layers. Similarly, the plurality of dielectric layers 530 may be substantially similar to the plurality of dielectric layers 330 as described above, and as such similarly comprises a set of dielectric layers providing either increased reflectivity (e.g., functioning as a Bragg mirror) or increased transmissivity (e.g., functioning as an anti-reflective (AR) coating). Further, for example, the substrate 540 may be substantially similar to the substrate 340 as described above, and as such similarly may comprise a silicon (Si) based substrate, and may have 75 mm diameter with thickness of 6 mm. In some instances, the substrate may comprise (e.g., may be also made of) material that is substantially transparent in the operating wavelength range, especially if the dielectric layers 530 are configured to increase transmissivity.

The use of a multi-layer based grating structure may allow for some modification in some of the components. For example, the number of layers used in the plurality of matching layers 520 may be reduced, without affecting performance. For example, in the example embodiment illustrated in FIG. 5, the plurality of matching layers 520 in the morphology 500 comprises an H-L-H (specifically an H2-L-H2) arrangement, comprising a top H2 layer that functions as an etch-stop layer 522, followed by an L-H2 layer pair.

Various aspects or parameters of at least some of the features and/or components of the morphology 500 may be adaptively selected based on the desired performance. In this regard, in some embodiments, the optimization algorithm described herein may be used in determining at least some of these aspects or parameters. For example, the optimization algorithm may be used in determining number and/or thickness of each the layers used in the multi-layer grating lines 510. In the example embodiment illustrated in FIG. 5, based on use of such optimization algorithm, the thickness of each of the layers 512, 514, and 516 in the multi-layer grating lines 510 may be set to, respectively: 211 nm, 360.7 nm, and 222 nm.

As noted, the use of multi-layer based grating structure may improve performance, compared to single-layer based grating structure. This is illustrated in, and described in more detail with respect to, FIG. 6.

Figure 6:
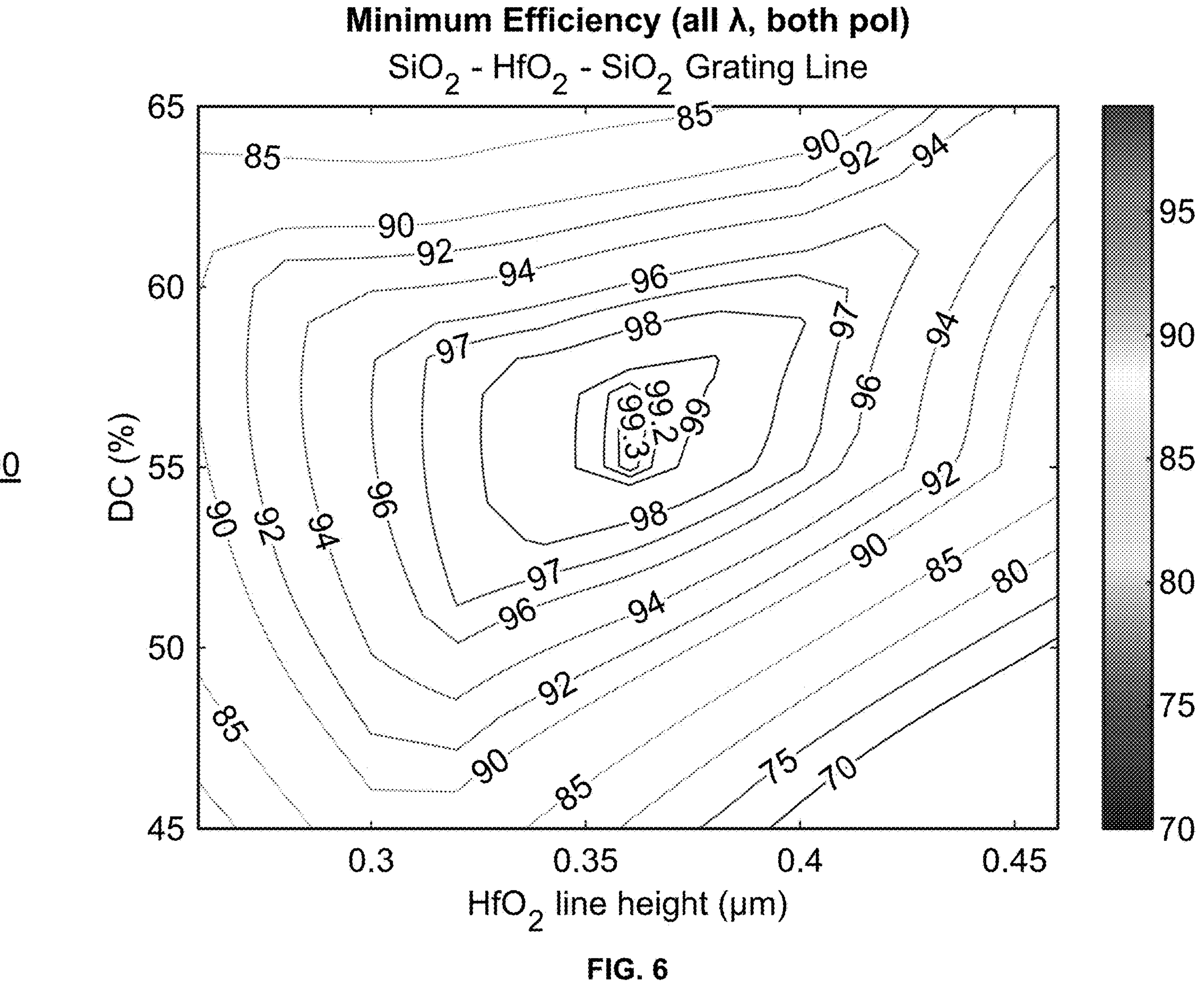
FIG. 6 is a contour plot illustrating performance contours for an example multi-layer reflection grating based morphology.

FIG. 6 is a contour plot illustrating performance contours for an example multi-layer reflection grating based morphology. Shown in FIG. 6 is a plot 600. In this regard, plot 400 comprises data representing performance (minimum diffraction efficiency in %, for all wavelengths, λ, and for two polarization components) of a multi-layer reflection grating based morphology (e.g., the morphology 500), as a function of duty cycle (y-axis) and line height in μm (x-axis) of the grating lines in the morphology.

As shown in FIG. 6, plot 600 comprises contours of minimum diffraction efficiency—that is, contour lines connecting data points corresponding to particular minimum diffraction efficiency value. As used herein, minimum diffraction efficiency corresponds to the minimum value for R1 over swept wavelengths, λ, and for the two polarization components. The plot 600 shows the performance contours for the 3-layer based morphology 500. In this regard, for the data used in plot 600, only the $HfO_2$ grating layer thickness is tuned with the thicknesses of the two $SiO_2$ layer held fixed.

In particular, the line height tuning may be accomplished by tuning the $HfO_2$ layer thickness, while leaving the $SiO_2$ layer thicknesses within the grating line fixed. As illustrated by plot 600, use of multi-layer grating yields improved performance. In this regard, in both plot 600 and plot 400, the contour plots (performance maps) show the same amount of "area" (e.g., ΔD=20% and Δline height=200 nm). This permits a visual comparison of tolerances for the two designs. However, relative to plot 400, the performance contours of plot 600 show larger window/area where 97% minimum diffraction efficiency is achieved, and even 99% minimum diffraction efficiency may be reached.

Thus, in addition to manufacturability improvements described above, with multi-layer reflection grating based morphology, a peak value may be higher and for a given performance level, and larger morphological variation may be tolerated—e.g., equal-value performance contours enclose larger area(s) in plot 600 compared to plot 400.

An example diffraction grating based morphology, in accordance with the present disclosure, comprises a plurality of grating lines; a plurality of intermediate layers; and a substrate bearing both of the plurality of grating lines and the plurality of intermediate layers; where one or more of the plurality of grating lines comprise a plurality of grating layers; and where at least two of the plurality of grating layers comprise different refractive index (RI) material.

In an example embodiment, the plurality of grating layers comprises one or more layers comprising low refractive index (RI) material and one or more layers comprising high refractive index (RI) material.

In an example embodiment, a top layer of the plurality of grating layers comprises low refractive index (RI) material.

In an example embodiment, the one or more layers comprise low refractive index (RI) material and one or more layers comprising high refractive index (RI) material are arranged in alternating manner.

In an example embodiment, the low refractive index (RI) material used in the plurality of grating layers comprises silicon dioxide ($SiO_2$).

In an example embodiment, the high refractive index (RI) material used in the plurality of grating layers comprises hafnium dioxide ($HfO_2$).

In an example embodiment, the plurality of intermediate layers comprises a plurality of matching layers.

In an example embodiment, a first layer of the plurality of matching layers that is in contact with the plurality of grating lines is an etch-stop layer.

In an example embodiment, the etch-stop layer comprises high refractive index (RI) material.

In an example embodiment, the plurality of matching layers comprises layers having different refractive index (RI) material.

In an example embodiment, the plurality of matching layers comprises one or more layers comprising low refractive index (RI) material and one or more layers comprising high refractive index (RI) material.

In an example embodiment, the one or more layers comprise low refractive index (RI) material and one or more layers comprising high refractive index (RI) material are arranged in alternating manner.

In an example embodiment, the low refractive index (RI) material used in the plurality of matching layers comprises silicon dioxide ($SiO_2$).

In an example embodiment, the high refractive index (RI) material used in the plurality of matching layers comprises hafnium dioxide ($HfO_2$).

In an example embodiment, the plurality of intermediate layers comprises a plurality of dielectric layers.

In an example embodiment, the plurality of dielectric layers comprises layers having different refractive index (RI) material.

In an example embodiment, the plurality of dielectric layers comprises one or more layers comprising low refractive index (RI) material and one or more layers comprising high refractive index (RI) material.

In an example embodiment, the one or more layers comprising low refractive index (RI) material and one or more layers comprising high refractive index (RI) material are arranged in alternating manner.

In an example embodiment, the low refractive index (RI) material used in the plurality of dielectric layers comprises silicon dioxide ($SiO_2$).

In an example embodiment, the one or more layers comprise high refractive index (RI) material at least one first layer comprising a first high refractive index (RI) material and at least one second layer comprising a second high refractive index (RI) material, where the first high refractive index (RI) material and the second high refractive index (RI) material are different.

In an example embodiment, the first high refractive index (RI) material comprises tantalum pentoxide ($Ta_2O_5$).

In an example embodiment, the second high refractive index (RI) material comprises hafnium dioxide ($HfO_2$).

In an example embodiment, the substrate comprises silicon (Si).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A diffraction grating based morphology comprising:

a plurality of grating lines;

a plurality of intermediate layers; and a substrate bearing both of the plurality of grating lines and the plurality of intermediate layers;

wherein one or more of the plurality of grating lines comprise a plurality of grating layers;

wherein at least two of the plurality of grating layers comprise different refractive index (RI) material;

wherein at least two of the plurality of intermediate layers comprise different refractive index (RI) material; and wherein at least one intermediate layer comprises refractive index (RI) material not used in the plurality of grating layers.

2. The diffraction grating based morphology according to claim 1, wherein the plurality of grating layers comprises one or more layers comprising low refractive index (RI) material and one or more layers comprising high refractive index (RI) material, wherein the low refractive index (RI) material and the high refractive index (RI) material differ based on, at least, the high refractive index (RI) material having a refractive index (RI) that is higher by a pre-determined minimum difference.

3. The diffraction grating based morphology according to claim 2, wherein a top layer of the plurality of grating layers comprises the low refractive index (RI) material.

4. The diffraction grating based morphology according to claim 2, wherein the one or more layers comprising the low refractive index (RI) material and one or more layers comprising the high refractive index (RI) material are arranged in alternating manner.

5. The diffraction grating based morphology according to claim 2, wherein the low refractive index (RI) material comprises silicon dioxide ($SiO_2$).

6. The diffraction grating based morphology according to claim 2, wherein the high refractive index (RI) material comprises hafnium dioxide ($HfO_2$).

7. The diffraction grating based morphology according to claim 1, wherein the plurality of intermediate layers comprises a plurality of matching layers.

8. The diffraction grating based morphology according to claim 7, wherein a first layer of the plurality of matching layers that is in contact with the plurality of grating lines is an etch-stop layer.

9. The diffraction grating based morphology according to claim 8, wherein the etch-stop layer comprises high refractive index (RI) material.

10. The diffraction grating based morphology according to claim 7, wherein the plurality of matching layers comprises layers having different refractive index (RI) material.

11. The diffraction grating based morphology according to claim 10, wherein the plurality of matching layers comprises one or more layers comprising low refractive index (RI) material and one or more layers comprising high refractive index (RI) material, wherein the low refractive index (RI) material and the high refractive index (RI) material differ based on, at least, the high refractive index (RI) material having a refractive index (RI) that is higher by a pre-determined minimum difference.

12. The diffraction grating based morphology according to claim 11, wherein the one or more layers comprising the low refractive index (RI) material and one or more layers comprising the high refractive index (RI) material are arranged in alternating manner.

13. The diffraction grating based morphology according to claim 11, wherein the low refractive index (RI) material comprises silicon dioxide ($SiO_2$).

14. The diffraction grating based morphology according to claim 11, wherein the high refractive index (RI) material comprises hafnium dioxide ($HfO_2$).

15. The diffraction grating based morphology according to claim 1, wherein the plurality of intermediate layers comprises a plurality of dielectric layers.

16. The diffraction grating based morphology according to claim 15, wherein the plurality of dielectric layers comprises layers having different refractive index (RI) material.

17. The diffraction grating based morphology according to claim 16, wherein the plurality of dielectric layers comprises one or more layers comprising low refractive index (RI) material and one or more layers comprising high refractive index (RI) material, wherein the low refractive index (RI) material and the high refractive index (RI) material differ based on, at least, the high refractive index (RI) material having a refractive index (RI) that is higher by a pre-determined minimum difference.

18. The diffraction grating based morphology according to claim 17, wherein the one or more layers comprising the low refractive index (RI) material and one or more layers comprising the high refractive index (RI) material are arranged in alternating manner.

19. The diffraction grating based morphology according to claim 17, wherein the low refractive index (RI) material comprises silicon dioxide ($SiO_2$).

20. The diffraction grating based morphology according to claim 17, wherein the one or more layers comprising the high refractive index (RI) material comprises at least one first layer comprising a first high refractive index (RI) material and at least one second layer comprising a second high refractive index (RI) material, and wherein the first high refractive index (RI) material and the second high refractive index (RI) material are different.

21. The diffraction grating based morphology according to claim 20, wherein the first high refractive index (RI) material comprises tantalum pentoxide ($Ta_2O_5$).

22. The diffraction grating based morphology according to claim 20, wherein the second high refractive index (RI) material comprises hafnium dioxide ($HfO_2$).

23. The diffraction grating based morphology according to claim 1, wherein the substrate comprises silicon (Si).

* * * * *